(No Model.)
O. TABER.
SADDLE TREE.
No. 480,218. Patented Aug. 2, 1892.
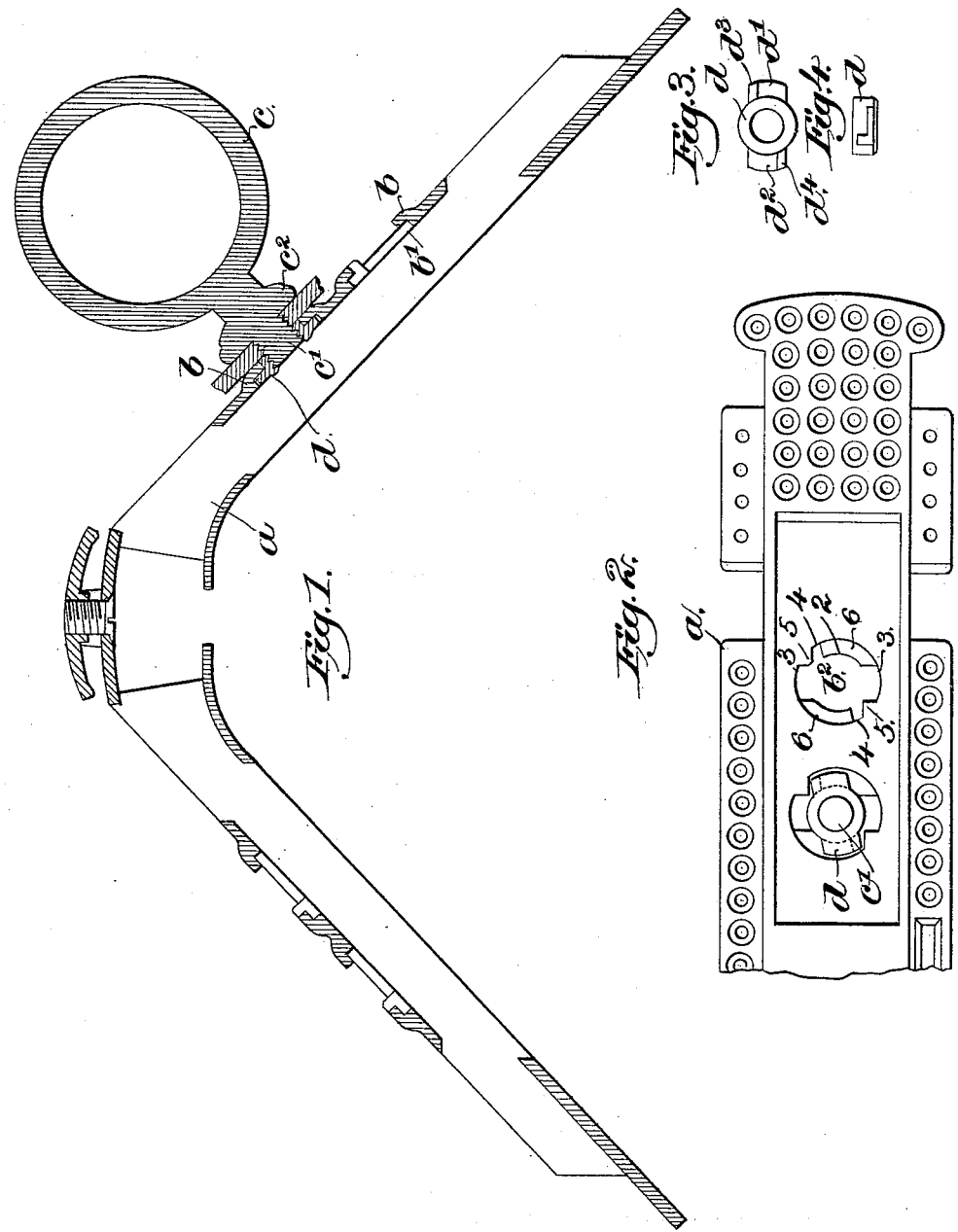
Witnesses,
Edward F. Allen.
Louis N. Gowell
Inventor:
Orrin Taber.
by Crosby & Gregory
Attys.

UNITED STATES PATENT OFFICE.

ORRIN TABER, OF NASHUA, NEW HAMPSHIRE, ASSIGNOR TO THE NASHUA SADDLERY HARDWARE COMPANY, OF SAME PLACE.

SADDLE-TREE.

SPECIFICATION forming part of Letters Patent No. 480,218, dated August 2, 1892.

Application filed December 9, 1891. Serial No. 414,474. (No model.)

*To all whom it may concern:*

Be it known that I, ORRIN TABER, of Nashua, county of Hillsborough, State of New Hampshire, have invented an Improvement in Saddle-Trees, of which the following description, in connection with the accompanying drawings, is a specification, like letters and figures on the drawings representing like parts.

In the manufacture of saddle-trees the terrets have been secured to the tree by nuts turned on the screw-threaded shanks of the terrets from the inner or under side of the tree. This nut frequently works loose, and in that class of saddle-trees known as "running back-band" trees it interferes with the said back-band in many instances, and is hence objectionable.

My invention comprehends a novel means for securing the terrets to the tree, whereby the same may be secured from the outside, and when so secured the nut cannot work loose, and, furthermore, cannot in anywise obstruct or interfere with the running back-band.

Figure 1 shows in vertical longitudinal section a saddle-tree embodying this invention; Fig. 2, an under side view of the right-hand portion of the saddle-tree shown in Fig. 1; and Figs. 3 and 4, plan and end views, respectively, of the locking-nut to be referred to.

The saddle-tree $a$ is made of usual shape and provided with the usual raceway for the running back-band, and is also provided with the usual holes for the fastenings for securing the upholstery.

Each half or side of the saddle-tree is provided on its upper side with two bosses $b$, made quite large in diameter and recessed at their under sides, as at $b'$, and cut through to present holes, as $b^2$. (See Fig. 2.) These holes $b^2$ are irregular in shape, comprising a circular central portion 2, having oppositely-extended side openings 3 3, and also oppositely-extended side openings 4 4, thereby leaving opposite shoulders 5 5, which lie flush with the inner or under face of the tree, or substantially so, and leaving shoulders 6 6, which lie above the level of the inner or under face of the tree at the bottom of the recesses.

Two holes are shown in each part of the tree, although, as is well known, but one will be used at a time, and hence, if desired, one may be eliminated.

The terret $c$ consists of the usual eye and screw-threaded shank $c'$ and flange $c^2$.

The locking-nut $d$ (see Figs. 3 and 4) comprise the internally-screw-threaded central portion and oppositely-extended projections $d'$ $d^2$, one of which projections has a shoulder, as $d^3$, at one side of it, and the other projection has a shoulder, as $d^4$, at the opposite side of it. This locking-nut, with its projections $d'$ $d^2$, is of suitable length to pass through the hole $b^2$ in the tree from the outside, the openings 3 3 permitting the passage of the projections $d'$ $d^2$. The nut may then be turned until the projections $d^3$ $d^4$ enter the openings 4 4, at which time the projections $d'$ $d^2$ will bear upon the shoulders 6 6. When in this position, the terret may be screwed into the nut, as shown in Fig. 1, the flange $c^2$ bearing upon any material that may be placed upon the top of the tree, the nut being held by the terret in its locking position. The screw-threaded shank $c'$ is made only as long as required to engage the nut, so as not to enter and obstruct the raceway, which receives the running back-band, and the nut, being locked in place, cannot become loosened, the recesses on the inner or under side of the boss or part of the tree being of a depth substantially equal to the thickness of the nut, so that the latter will be contained in said recess, and hence will not in any way obstruct the aforesaid raceway.

I do not desire to limit my invention to the particular shape of the parts as shown, so long as they are made to accomplish the results specified.

I claim—

1. A saddle-tree having a boss on its upper side, a hole through it for the screw-threaded shank of the terret, and a terret-nut provided with projections, the hole having oppositely-extended side openings and a connected central portion to permit the passage therethrough of the nut, and a recess in the under side of the boss to receive and hold the nut when inserted therein, substantially as described.

2. A saddle-tree having a boss thereon, a hole through it for the screw-threaded shank of a terret and shaped to provide openings 3 3 and 4 4, and the locking-nut $d$ for the screw-threaded shank of the terret, having projections $d'$ $d^2$ and shoulders $d^3$ $d^4$, said shoulders resting in the openings 4 4 when the nut is in place, substantially as described.

3. A saddle-tree having a hole through it for the screw-threaded shank of the terret and shaped to provide openings 3 3 and 4 4, and also having a nut-receiving recess in its under side, comprising the shoulders 6 6, and a locking-nut adapted to be turned on the shank of the terret in said recess and having projections $d'$ $d^2$ and shoulders $d^3$ $d^4$, substantially as described.

In testimony whereof I have signed my name to this specification in the presence of two subscribing witnesses.

ORRIN TABER.

Witnesses:
BERNICE J. NOYES,
FRANCES M. NOBLE.